Figure 3:
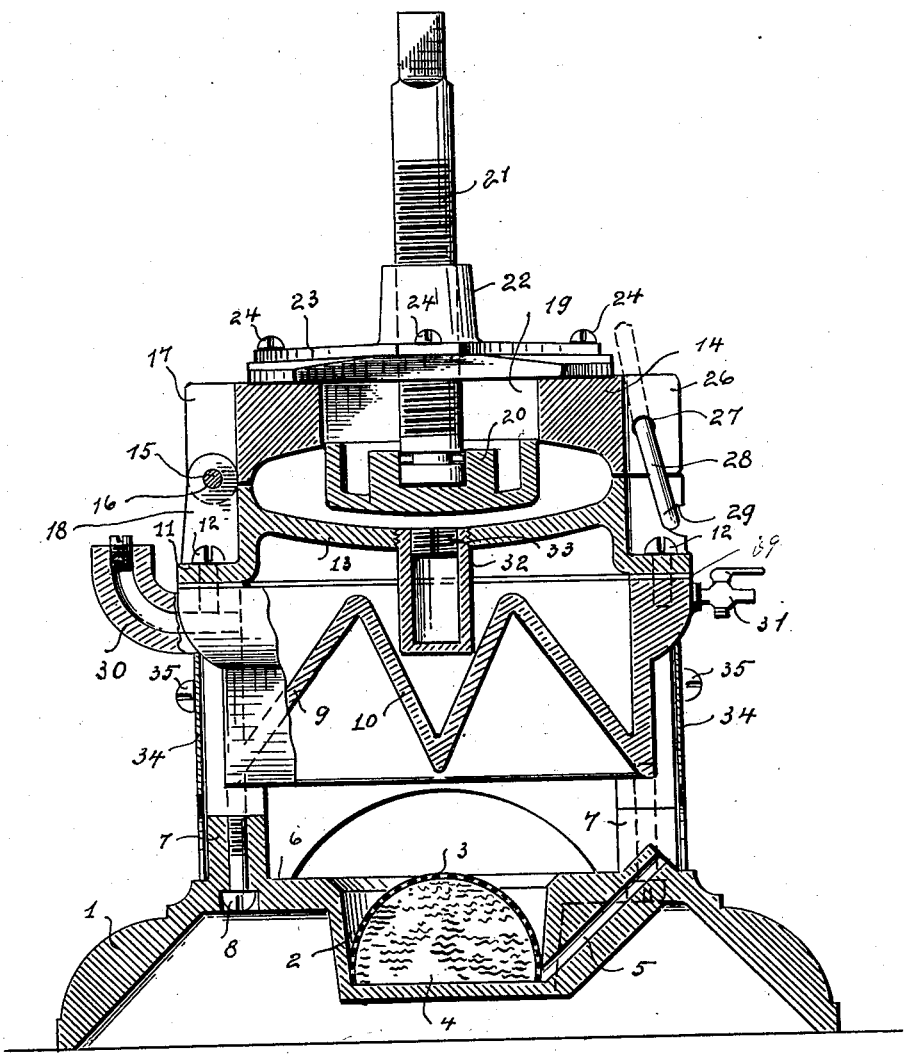

No. 636,236. Patented Nov. 7, 1899.
J. E. BANCROFT.
VULCANIZER.
(Application filed Dec. 17, 1897. Renewed Apr. 7, 1899.)
(No Model.) 3 Sheets—Sheet 1.
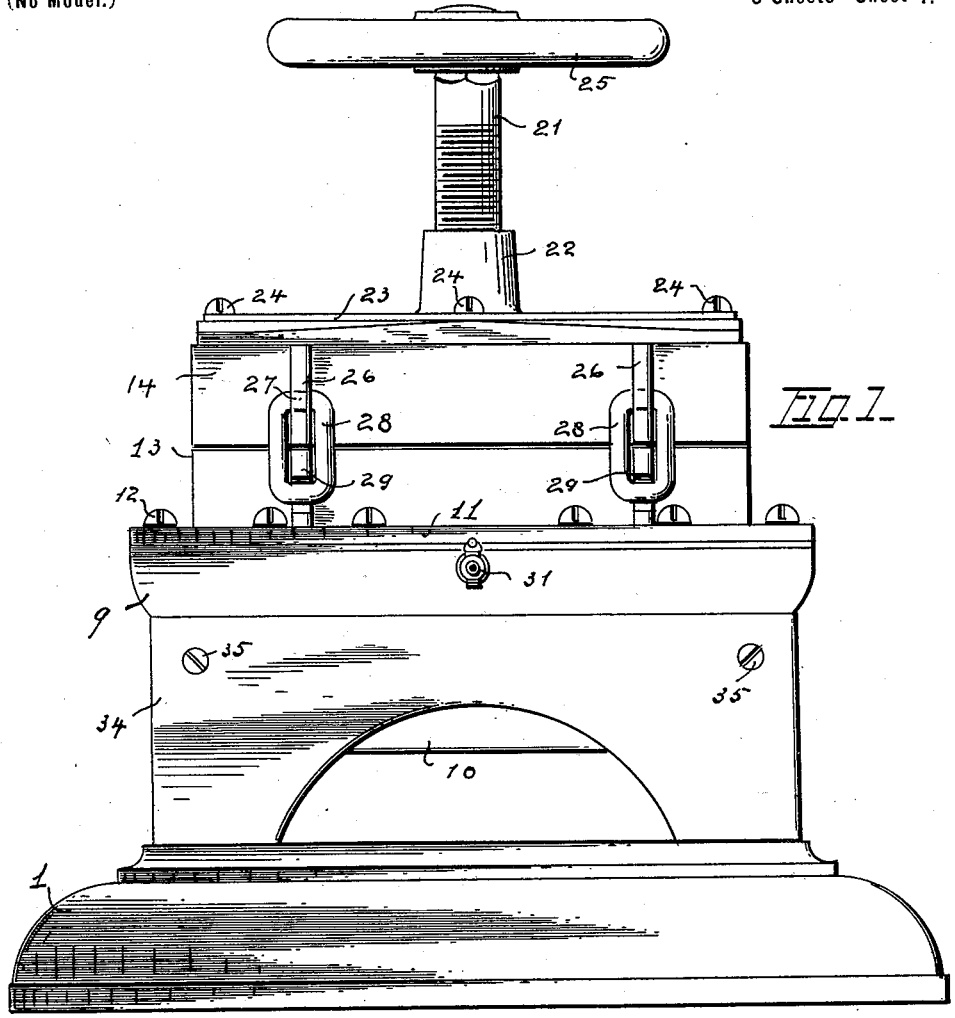
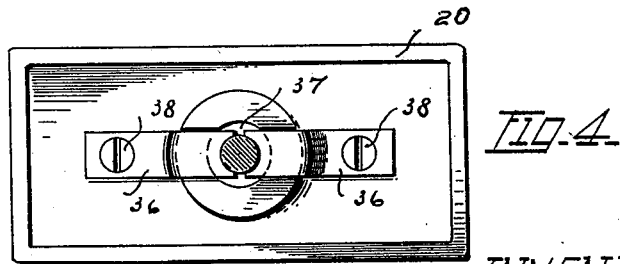
WITNESSES
INVENTOR
James E Bancroft
By William Webster
Atty

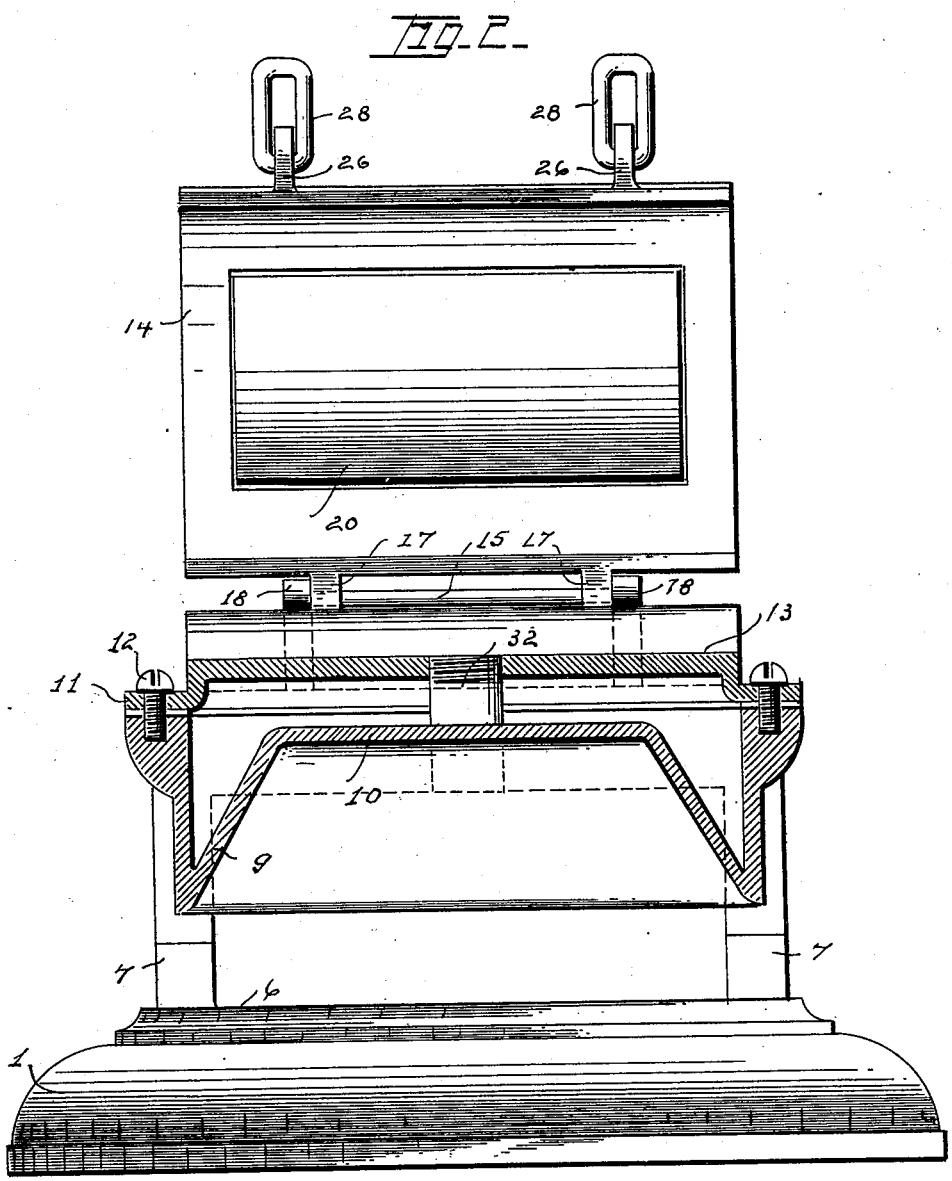

No. 636,236. Patented Nov. 7, 1899.
J. E. BANCROFT.
VULCANIZER.
(Application filed Dec. 17, 1897. Renewed Apr. 7, 1899.)

(No Model.) 3 Sheets—Sheet 3.

WITNESSES
H. H. Martin
Albert Rosenfeld.

INVENTOR
James E. Bancroft
By William Webster
Atty

UNITED STATES PATENT OFFICE.

JAMES E. BANCROFT, OF TOLEDO, OHIO, ASSIGNOR TO THE NATIONAL CEMENT AND RUBBER MANUFACTURING COMPANY, OF SAME PLACE.

VULCANIZER.

SPECIFICATION forming part of Letters Patent No. 636,236, dated November 7, 1899.

Application filed December 17, 1897. Renewed April 7, 1899. Serial No. 712,161. (No model.)

*To all whom it may concern:*

Be it known that I, JAMES E. BANCROFT, of Toledo, county of Lucas, and State of Ohio, have invented certain new and useful Improvements in Vulcanizers; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a vulcanizer, having especial relation to an apparatus for use in repairing bicycle-tires, and has for its object to provide an apparatus of so simple and economical construction that it may be brought within reach of a private individual, as well as repair-shops.

A further object is to provide a water-jacket, supported upon a suitable base interposed between the caloric medium and the thermal plate, whereby the burning of the tire is prevented during the process of vulcanization.

A further object is to mount the water-jacket upon a portable base, having formed therein a receptacle for the caloric medium, whereby a predetermined amount of caloric agent is introduced at the base of the vulcanizer, thereby heating the water-jacket and vulcanizing the tire to the proper degree, with a minimum amount of labor and attention.

A further object is to secure a pendent pocket portion to the base of the thermal plate, adapted to house and protect the valve-stem during the operation of securing the valve-stem to the tire, and provide a suitable perforated plug for closing the said aperture in the thermal plate while another portion of the tire is being vulcanized.

In the drawings, Figure 1 is a front elevation of the vulcanizer. Fig. 2 is a longitudinal section through the same. Fig. 3 is a transverse vertical section. Fig. 4 is a top plan view illustrating a method of securing the revoluble clamp-stem for compressing the tire between the thermal plate and the movable clamp portion.

In carrying out my invention I employ a base 1, having centrally located therein a receptacle 2 for the reception of the caloric agent. The receptacle 2 is of such dimension as to contain within the circular perforated burner-screen 3 a sufficient quantity of caloric medium to heat the water and maintain a temperature sufficiently to properly vulcanize the tire. Within the screen 3, which is housed in the receptacle 2, is an asbestos wick 4 for the absorption of the caloric medium, which is introduced through an aperture 5, the walls thereof being made integral with the base 1. At each corner of the top 6 of the base 1 are projections 7, adapted to support and secure, by means of screws or bolts 8, the lower section of the water-jacket 9. The lower section of the water-jacket 9 is corrugated, as shown in Figs. 3 and 4, and comprises a plurality of triangular sections 10, whereby the heating-surface is greatly increased for the absorption of the maximum amount of thermal units.

11 designates a top closure which is secured to the lower section of the water-jacket 9 by means of bolts or screws 12, circumferentially spaced around the margin of the top and bottom sections of the water-jacket. The closure 11 comprises a thermal plate 13, and is of such contour upon its upper edge as to conform to the tire when the air is exhausted therefrom.

14 designates a yoke portion pivotally secured to the rear of the water-jacket 9 by means of a bar 15, passing through perforations 16, located in lugs 17 and 18, integral with the yoke portion 14 and the closure 11. The yoke portion 14 has a central aperture 19, as shown in Fig. 3, and a movable clamp portion 20 is held in the aperture of the yoke portion by means of a screw 21, engaging a coincident screw-threaded aperture in the boss 22, integral with the closure-plate 23, which is secured to the top of the yoke portion 14 by means of screws 24.

25 designates a hand-wheel secured to the top of the screw 21. I may, however, form a square shoulder upon the screw 21 and employ a wrench.

In opposite relation to the pivotal side of the yoke portion 14 and integral therewith are a plurality of projecting lugs 26, having pivotally mounted in apertures 27 locking-links 28, adapted to engage a coincident locking portion 29, integral with the thermal plate 13 of the top closure 11.

30 designates a rearward projection having a port therein for the introduction of water into the water-jacket 9, and 31 designates an outlet for the water. A pendent socket portion 32 is secured to the thermal plate 13, located centrally therein and projecting downwardly into the water-space, as shown in Figs. 2 and 3. The aperture in the socket 32 is normally closed by a screw-threaded plug 33, which is perforated to allow the confined vapor of water or air to escape during the vulcanization of a portion of the tire. The heating or combustion chamber is surrounded by a jacket 34, of suitable material, and is secured to the supporting portions 7 by means of screws 35. The jacket 34 may form a complete closure for the combustion-chamber or may be provided with openings at the bottom thereof, as shown in Figs. 1, 2, and 3, or it may be partially opened at the bottom and perforated. The clamp portion 20 is secured to the screw 21 by means of a plurality of metal plates 36, engaging a portion of the circumference at the recessed portion 37 of the screw. The plates 36 are secured to the clamp portion 20 by means of screws 38, as shown in Fig. 4.

39 designates a gasket interposed between the lower section of the water-jacket 9 and the top section 11.

In operation, the fractured portion of the tire being suitably prepared, the tire is clamped upon the thermal plate 13, and the clamp portion 20 is forced downwardly by the revolution of the screw 21, thereby compressing and securing the tire in position upon the thermal plate. Previous to this operation the pivotal yoke portion 14, which has been in an upright position, is swung downwardly until it rests upon the thermal plate 13, the links 28 engaging the coincident locking portion 29, integral with the thermal plate. A predetermined amount of caloric medium is now introduced through the aperture 5 into the receptacle 2, located in the base, and ignited. The developed thermal units are absorbed by the water in the jacket 9, heating the thermal plate 13 in contact with the tire and vulcanizing the portion of tire to be repaired. If desired to secure a valve-stem to the tire, the plug 33 in the socket 32 is removed, the tire being previously prepared in the ordinary manner, and the valve-stem is inserted into the socket 32, the tire clamped in position, and the operation repeated, as has heretofore been described.

What I claim is—

1. In a vulcanizer, a base having a receptacle for the caloric agent formed integral therewith, a water-jacket supported above the caloric-receptacle secured to the base, a thermal plate formed upon the top of the water-jacket, a yoke pivotally secured to the top of the water-jacket, adapted to be securely held in a horizontal position, a movable clamping device held in the pivotal yoke portion, whereby the tire may be clamped in position, a jacket surrounding the combustion-chamber, and an aperture formed in the base for the introduction of caloric medium into the receptacle.

2. In a vulcanizer, a base having a receptacle formed integral therewith, a perforated metal plate located in the receptacle encircling the wick portion, a duct or aperture communicating from the wick to the outer portion of the base for the introduction of the caloric medium, upwardly-projecting lugs formed upon the top of the base, adapted to support the lower section of the water-jacket, bolts for securing the two sections, a top-closure plate secured to the lower section of the water-jacket, a thermal plate, a clamping device pivotally secured to the top section, inlet and outlet ports from the water-jacket, and a jacket surrounding the combustion-chamber of the vulcanizer.

3. In a vulcanizer, a base, a receptacle located therein adapted to contain a predetermined amount of a caloric medium, a water-jacket supported upon the base, the lower portion thereof being corrugated to increase the heating-surface exposed to the caloric medium, a thermal plate formed upon the top closure of the water-jacket, conforming to the contour of the tire, a yoke portion pivotally secured to the top-closure plate and adapted to be secured in a horizontal position in opposite relation to the pivotal portion of the yoke, having a central aperture, a movable clamping-plate secured therein to a screw engaging coincident screw-threaded portion formed in a projecting boss integral with a top-closure plate secured to the yoke portion, means for revolving the screw, means for the introduction of water into the water-jacket, a water-outlet, and an aperture formed in the base connecting with the interior of the caloric-receptacle.

In testimony that I claim the foregoing as my own I hereby affix my signature in presence of two witnesses.

JAMES E. BANCROFT.

Witnesses:
WILLIAM WEBSTER,
MAUD SCHUMACHER.